United States Patent
Galvan et al.

(10) Patent No.: US 10,932,465 B2
(45) Date of Patent: Mar. 2, 2021

(54) ANTIMICROBIAL MIXTURE CONTAINING 4-(3-ETHOXY-4-HYDROXYPHENYL)BUTAN-2-ONE AND A DIOL, AND COSMETIC COMPOSITION CONTAINING SAME

(71) Applicant: L'OREAL, Paris (FR)

(72) Inventors: Julien Galvan, Chevilly Larue (FR); Sylvie Cupferman, Chevilly Larue (FR); Gael Malet, Chevilly Larue (FR)

(73) Assignee: L'OREAL, Paris (FR)

( * ) Notice: Subject to any disclaimer, the term of this patent is extended or adjusted under 35 U.S.C. 154(b) by 0 days.

(21) Appl. No.: 16/626,074

(22) PCT Filed: Jun. 27, 2018

(86) PCT No.: PCT/EP2018/067308
§ 371 (c)(1),
(2) Date: Dec. 23, 2019

(87) PCT Pub. No.: WO2019/002398
PCT Pub. Date: Jan. 3, 2019

(65) Prior Publication Data
US 2020/0214287 A1    Jul. 9, 2020

(30) Foreign Application Priority Data

Jun. 30, 2017 (FR) .................................. 1756169
Aug. 18, 2017 (FR) .................................. 1757742

(51) Int. Cl.
*A01N 35/02* (2006.01)
*A01N 47/44* (2006.01)

(52) U.S. Cl.
CPC ............. *A01N 35/02* (2013.01); *A01N 47/44* (2013.01)

(58) Field of Classification Search
CPC ...... A61Q 17/005; A41D 31/30; A01N 35/02; A01N 47/44
See application file for complete search history.

(56) References Cited

U.S. PATENT DOCUMENTS

| | | | | |
|---|---|---|---|---|
| 6,106,505 A | * | 8/2000 | Modak | A61L 27/34 424/422 |
| 2005/0048005 A1 | * | 3/2005 | Stockel | A61K 6/20 424/49 |
| 2009/0306154 A1 | * | 12/2009 | Pillai | A61K 8/345 514/361 |
| 2014/0057991 A1 | * | 2/2014 | Chevalier | A61K 8/37 514/678 |
| 2015/0265666 A1 | * | 9/2015 | Modak | A01N 47/44 424/616 |

FOREIGN PATENT DOCUMENTS

WO    WO 03/069994 A1    8/2003
WO    WO 2011/039445 A1    4/2011

OTHER PUBLICATIONS

Hasheminia, et al; title: Synergistic antibacterial activity of chlorhexidine and hydrogen peroxide against Enterococcus faecalis; J Oral Sci. 2013; vol. 55, issue 4, pp. 275-280. (Year: 2013).*

* cited by examiner

*Primary Examiner* — Yanzhi Zhang
(74) *Attorney, Agent, or Firm* — Polsinelli PC

(57) ABSTRACT

The invention relates to an antimicrobial mixture containing 4-(3-ethoxy-4-hydroxy-phenyl)butan-2-one and an additional compound chosen from chlorhexidine digluconate, chlorhexidine hydrochloride and a polyhexamethylene biguanide salt, and also to a cosmetic composition containing such a mixture. Use in caring for, making up and cleansing keratin materials.

22 Claims, No Drawings

ANTIMICROBIAL MIXTURE CONTAINING 4-(3-ETHOXY-4-HYDROXYPHENYL)BUTAN-2-ONE AND A DIOL, AND COSMETIC COMPOSITION CONTAINING SAME

CROSS REFERENCE TO RELATED APPLICATIONS

This application is a National Phase filing under 35 U.S.C. § 371 of PCT/EP2018/067308 filed on 27 Jun. 2018; which application in turn claims priority to Application No. 1756169 filed in France on 30 Jun. 2017; and Application No. 1757742 filed in France on 18 Aug. 2017. The entire contents of each application are hereby incorporated by reference.

The present invention relates to an antibacterial mixture containing 4-(3-ethoxy-4-hydroxyphenyl)butan-2-one and an additional compound chosen from a particular chlorhexidine compound and a polyhexamethylene biguanide salt, and also to a cosmetic composition containing such a mixture.

4-(3-Ethoxy-4-hydroxyphenyl)butan-2-one (ketone compound) is a useful substance as a preserving agent for cosmetic compositions, for protecting the compositions against microbial contamination, as described in patent application WO 2011/039445.

However, it is desirable to be able to incorporate said ketone compound in reduced concentration in compositions, especially cosmetic or dermatological compositions, while at the same time maintaining good antimicrobial conservation performance. Combinations of the ketone compound with other compounds that have antimicrobial efficacy are thus sought for this purpose.

The inventors have discovered, unexpectedly, that the combination of 4-(3-ethoxy-4-hydroxyphenyl)butan-2-one with an additional compound chosen from chlorhexidine digluconate, chlorhexidine hydrochloride and a polyhexamethylene biguanide salt makes it possible to obtain an antimicrobial mixture which has synergistic antimicrobial activity.

The results of the examples described below show the synergistic antimicrobial activity obtained with the minimum inhibitory concentration (MIC) measurements taken with several mixtures. The antimicrobial activity is considered as being synergistic when the antimicrobial mixture makes it possible to obtain a percentage of strain growth of less than or equal to 25%, or even less than or equal to 20%.

The combination of 4-(3-ethoxy-4-hydroxyphenyl)butan-2-one with a chlorhexidine compound chosen from chlorhexidine digluconate and chlorhexidine hydrochloride makes it possible to obtain an antimicrobial mixture with synergistic antimicrobial activity, in particular on moulds, especially on *Aspergillus niger*, and on yeasts, in particular on *Candida albicans*.

Patent applications FR-A-2 962 328 and FR-A-2 973 229 describe a cosmetic composition for treating body odour associated with human perspiration, comprising a 2-alkoxy-4-alkylketone phenol compound, and optionally an additional deodorant active agent such as chlorhexidine and salts thereof.

These documents do not specifically describe an antimicrobial mixture constituted by the combination of 4-(3-ethoxy-4-hydroxyphenyl)butan-2-one with a chlorhexidine compound chosen from chlorhexidine digluconate and chlorhexidine hydrochloride, nor do they suggest that such a mixture has synergistic antimicrobial activity on moulds, especially on *Aspergillus niger*, and on yeasts, in particular on *Candida albicans*.

The combination of 4-(3-ethoxy-4-hydroxyphenyl)butan-2-one with a polyhexamethylene biguanide salt, in particular the hydrochloride salt, makes it possible to obtain an antimicrobial mixture with synergistic antimicrobial activity, in particular on moulds, especially on *Aspergillus niger*.

Patent applications FR-A-2 962 328 and FR-A-2 973 229 describe a cosmetic composition for treating body odour associated with human perspiration, comprising a 2-alkoxy-4-alkylketone phenol compound, and optionally an additional deodorant active agent such as polyhexamethylene biguanide salts.

These documents do not specifically describe an antimicrobial mixture constituted by the combination of 4-(3-ethoxy-4-hydroxyphenyl)butan-2-one with a polyhexamethylene biguanide salt, nor do they suggest that such a mixture has synergistic antimicrobial activity on moulds, especially on *Aspergillus niger*.

More precisely, a subject of the invention is an antimicrobial mixture comprising, or constituted by (or consisting of), 4-(3-ethoxy-4-hydroxyphenyl)butan-2-one and an additional compound chosen from chlorhexidine digluconate, chlorhexidine hydrochloride and a polyhexamethylene biguanide salt.

A subject of the invention is also a composition, especially a cosmetic composition, comprising, in a physiologically acceptable medium, said mixture described previously.

A further subject of the invention is a process for the non-therapeutic cosmetic treatment of keratin materials, comprising the application to the keratin materials of a composition as described previously. The process may be a cosmetic process for caring for or making up or cleansing keratin materials.

A subject of the invention is also a process for conserving a composition comprising a physiologically acceptable medium, in particular a cosmetic or dermatological composition, characterized in that it consists in incorporating into said composition an antimicrobial mixture as described previously.

A subject of the invention is also the use of the antimicrobial mixture described previously for conserving a composition comprising a physiologically acceptable medium.

4-(3-Ethoxy-4-hydroxyphenyl)butan-2-one is a compound of formula:

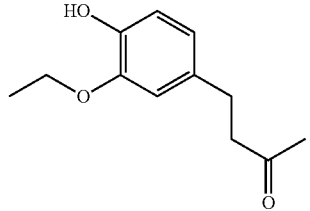

According to a first embodiment, a subject of the invention is an antimicrobial mixture comprising, or constituted by (or consisting of), 4-(3-ethoxy-4-hydroxyphenyl)butan-2-one and a chlorhexidine compound chosen from chlorhexidine digluconate and chlorhexidine hydrochloride.

The chlorhexidine compound is chosen from chlorhexidine digluconate and chlorhexidine hydrochloride.

Advantageously, 4-(3-ethoxy-4-hydroxyphenyl)butan-2-one and dehydroacetic acid or a salt thereof are present in said mixture in a content such that the 4-(3-ethoxy-4-hydroxyphenyl)butan-2-one/chlorhexidine compound weight ratio ranges from 2 to 3500, preferably ranges from 2 to 250 and preferentially ranges from 2 to 220.

The antimicrobial mixture according to the invention has synergistic antimicrobial activity, in particular on moulds, especially on *Aspergillus niger*, and on yeasts, in particular on *Candida albicans*.

According to a first implementation variant of the invention, the chlorhexidine compound present in the antimicrobial mixture is chlorhexidine digluconate.

The antimicrobial mixture may have a 4-(3-ethoxy-4-hydroxyphenyl)butan-2-one/chlorhexidine digluconate weight ratio ranging from 25 to 150, preferably ranging from 30 to 130 and preferentially ranging from 45 to 90. Such a mixture has synergistic antimicrobial activity on yeasts, especially on *Candida albicans*.

The antimicrobial mixture may have a 4-(3-ethoxy-4-hydroxyphenyl)butan-2-one/chlorhexidine digluconate weight ratio ranging from 10 to 75, preferably ranging from 10 to 60 and preferentially ranging from 10 to 40. Such a mixture has good synergistic antimicrobial activity on moulds, especially on *Aspergillus niger*.

According to a second implementation variant of the invention, the chlorhexidine compound present in the antimicrobial mixture is chlorhexidine hydrochloride.

The antimicrobial mixture may have a 4-(3-ethoxy-4-hydroxyphenyl)butan-2-one/chlorhexidine hydrochloride weight ratio ranging from 60 to 350, preferably ranging from 80 to 250 and preferentially ranging from 90 to 220. Such a mixture has good synergistic antimicrobial activity on yeasts, especially on *Candida albicans*.

The antimicrobial mixture may have a 4-(3-ethoxy-4-hydroxyphenyl)butan-2-one/chlorhexidine hydrochloride weight ratio ranging from 2 to 120, preferably ranging from 2 to 100 and preferentially ranging from 2 to 85. Such a mixture has good synergistic antimicrobial activity on moulds, especially on *Aspergillus niger*.

According to a second embodiment, a subject of the invention is an antimicrobial mixture comprising, or constituted by (or consisting of), 4-(3-ethoxy-4-hydroxyphenyl)butan-2-one and a polyhexamethylene biguanide salt.

The polyhexamethylene biguanide salt may be a salt chosen from hydrochloride, borate, acetate, gluconate, sulfonate, tartrate and citrate, in particular hydrochloride.

Use is preferably made of polyhexamethylene biguanide hydrochloride (CTFA name: polyaminopropyl biguanide), such as the product sold under the name Cosmocil® CQ by the company Lonza (aqueous solution containing 20% AM of compound).

Advantageously, the polyhexamethylene biguanide salt has a weight-average molecular weight (Mw) which may range from 1000 to 50 000, preferably from 1000 to 20 000, preferentially ranging from 1000 to 10 000 and more preferentially ranging from 1000 to 5000.

Advantageously, 4-(3-ethoxy-4-hydroxyphenyl)butan-2-one and the polyhexamethylene biguanide salt are present in said mixture in a content such that the 4-(3-ethoxy-4-hydroxyphenyl)butan-2-one/polyhexamethylene biguanide salt ratio ranges from 5 to 75, preferably from ranges 15 to 60 and preferentially ranges from 20 to 55.

The antimicrobial mixture according to the invention has synergistic antimicrobial activity, in particular on moulds, especially on *Aspergillus niger*.

According to a preferred embodiment of the invention, the polyhexamethylene biguanide salt present in the antimicrobial mixture is polyhexamethylene biguanide hydrochloride.

The compound 4-(3-ethoxy-4-hydroxyphenyl)butan-2-one may be present in the composition according to the invention in a content ranging from 0.01% to 5% by weight relative to the total weight of the composition, preferably ranging from 0.01% to 3% by weight, preferentially ranging from 0.01% to 2.5% by weight and more preferentially ranging from 0.01% to 2% by weight.

A subject of the invention is also a composition comprising, in a physiologically acceptable medium, the antimicrobial mixture described previously.

The term "physiologically acceptable medium" means a medium that is compatible with human keratin materials such as the skin, the scalp, the hair and the nails. Said medium may comprise one or more additional ingredients other than the ketone compound and said additional compound.

The composition may comprise at least one additional ingredient chosen from water, oils, polyols containing from 2 to 10 carbon atoms, gelling agents, surfactants, film-forming polymers, dyestuffs, fragrances, fillers, UV-screening agents, plant extracts, cosmetic and dermatological active agents, and salts.

The composition according to the invention may comprise an aqueous phase.

The composition may comprise water, which may be present at a content ranging from 5% to 90% by weight relative to the total weight of the composition, and preferably ranging from 35% to 75% by weight.

The composition may also comprise a polyol that is water-miscible at room temperature (25° C.), especially chosen from polyols especially containing from 2 to 10 carbon atoms, preferably containing from 2 to 6 carbon atoms, such as glycerol, propylene glycol, 1,3-propanediol, butylene glycol, pentylene glycol, hexylene glycol, dipropylene glycol, diethylene glycol or diglycerol.

The compositions according to the invention may be in the form of oil-in-water (O/W) emulsions, water-in-oil (W/O) emulsions or multiple emulsions (triple: W/O/W or O/W/O), oily solutions, oily gels, aqueous solutions, aqueous gels, solid compositions. These compositions are prepared according to the usual methods.

The compositions according to the invention may be more or less fluid and may have the appearance of a white or coloured cream, an ointment, a milk, a lotion, a serum, a paste or a foam. They may be optionally applied to the skin in aerosol form. They may also be in solid form, for example in the form of a stick or a compact powder.

The composition according to the invention may especially be in the form of:
  a makeup product, especially for making up the skin of the face, the body, or the lips or the eyelashes;
  an aftershave gel or lotion; a shaving product;
  a deodorant (stick, roll-on or aerosol);
  a hair-removing cream;
  a body hygiene composition such as a shower gel or a shampoo;
  a pharmaceutical composition;
  a solid composition such as a soap or a cleansing bar;
  an aerosol composition also comprising a pressurized propellant;

a hairsetting lotion, a hair-styling cream or gel, a dye composition, a permanent-waving composition, a lotion or a gel for combating hair loss, or a hair conditioner;

a composition for caring for or cleansing the skin.

A subject of the invention is also a process for preparing a composition, especially a cosmetic or dermatological composition, comprising a step of mixing 4-(3-ethoxy-4-hydroxyphenyl)butan-2-one, said additional compound described previously, and one or more additional ingredients, especially cosmetic or dermatological ingredients, such as those described previously.

The invention is illustrated in greater detail in the example that follows. The amounts of the ingredients are expressed as weight percentages.

EXAMPLE 1: DETERMINATION OF THE SYNERGISTIC ANTIMICROBIAL ACTIVITY AS MIC

The demonstration of a synergistic antimicrobial activity effect with a mixture of 4-(3-ethoxy-4-hydroxyphenyl)butan-2-one (referred to as substance A) and of additional compound (referred to as substance B) and a mixture of 4-(3-ethoxy-4-hydroxyphenyl)butan-2-one (referred to as substance A) and of chlorhexidine hydrochloride (referred to as substance C) is performed by calculating the synergy index (or FIC index) according to the following formula:

FIC Index=(MICa with B/MICa)+(MICb with A/MICb)

with:
MICa with B: minimum concentration of product A in the combination A+B which makes it possible to obtain an inhibitory effect
MICb with A: minimum concentration of product B in the combination A+B which makes it possible to obtain an inhibitory effect.
MICa: minimum inhibitory concentration of product A alone.
MICb: minimum inhibitory concentration of product B alone.

This formula was described for the first time in the article by F. C. Kull, P. C. Eisman, H. D. Sylwestrowka, and R. L. Mayer, Applied Microbiology 9:538-541, 1961.

For each compound tested alone, the MIC is considered as the first concentration which makes it possible to obtain a microbial growth percentage of less than or equal to 25%.

As regards the combinations tested, MICa with b and MICb with a are the respective concentrations of A and of B in the combinations which make it possible to obtain a microbial growth percentage of less than or equal to 25%.

Interpretation of the FIC Index:

When the FIC index value is less than or equal to 1, it is considered that the combination of test compounds has a synergistic effect.

The results obtained are presented in the following tables.

The combinations of compounds A and B were tested on the following strains: *Aspergillus niger* and *Candida albicans*.

The microbial strain *Aspergillus niger* ATCC 6275, and a double-concentration Sabouraud broth liquid culture medium supplemented with polyoxyethylenated (20 OE) sorbitan monopalmitate (Tween 40 from Croda) and Phytagel© BioReagent were used.

The microbial strain *Candida albicans* ATCC 10231 and a double-concentration Sabouraud broth liquid culture medium were used (i.e. a mixture of 5 g of Phytagel+0.6 g of Tween 40+60 g of Sabouraud broth).

A 96-well microplate and an incubation temperature of 32.5° C. are used.

The incubation time of the microplate is:
from 24 hours to 48 hours aerobically for *Aspergillus niger*,
from 18 hours to 24 hours aerobically for *Candida albicans*.

Tests

For Each Compound:

A=4-(3-ethoxy-4-hydroxyphenyl)butan-2-one compound

B=additional compound with, in particular:

B1=chlorhexidine digluconate compound (as an aqueous solution containing 20% active material)

B2=chlorhexidine hydrochloride compound

A 10% (weight/volume) stock solution was prepared by mixing 1 g of compound in 9 ml of aqueous 1‰ agar solution. Successive dilutions were made with the 1‰ agar solution.

Tests of Compounds a, B1 and B2 Alone

50 µL of each of the daughter solutions obtained containing compound A or B1 or B2 are added to the microplate wells. 100 µL of Sabouraud liquid nutrient broth seeded with the strain *Aspergillus niger* and 50 µL of aqueous 1‰ agar solution are also added thereto.

Tests of Compounds A+B1 or A+B2 as a Mixture

50 µL of each of the daughter solutions obtained containing compound A and 50 µL of each of the daughter solutions obtained containing compound B1 or B2 are added to the microplate wells. 100 µL of Sabouraud liquid nutrient broth seeded at double concentration with the strain *Aspergillus niger* are also added thereto.

Microbial Growth Control

A positive microbial growth control was also prepared. The positive microbial growth control corresponds to a mixture of 100 µL of aqueous 1‰ agar solution with 100 µL of Sabouraud liquid nutrient broth seeded at double concentration with the strain *Aspergillus niger* in the absence of compounds A, B1 and B2.

Absorbance Control of Compounds A, B1 and B2 Alone

An absorbance control was performed in parallel on compounds A, B1 and B2 alone. This control corresponds to 100 µL of double concentration sterile Sabouraud liquid nutrient broth+100 µL of double concentration compound A or B1 or B2.

In the three cases (absorbance control, growth control and test), the final volume present in each of the microplate wells is 200 µL.

In the two cases (test and control), the inoculum represents the concentration of the strain *Aspergillus niger* present in the final volume of the wells (200 µL) and is between 2 and $6 \times 10^5$ cfu/ml of *Aspergillus niger*.

The minimum inhibitory concentration (MIC) of each compound A, B1 and B2 alone and in combination was determined by means of optical density measurements at a wavelength of 620 nm.

The test as described above (tests, absorbance control and growth control) was performed again to test the combinations A+B1 and A+B2 on the strain *Candida albicans*.

The following results were obtained: (mass percentage of active material)

A) Mixtures with Compound B1: Chlorhexidine Digluconate

*Candida albicans*

|  | concentrations tested (in weight %) | | | |
|---|---|---|---|---|
|  | 0 A | 0.025 A | 0.05 A | 0.1 A |
| 0 B1 |  | 63 | 47 | 22 |
| 0.00025 B1 | 59 | 56 | 32 | 14 |
| 0.0005 B1 | 32 | 16 (FIC 0.75) | 6 (FIC 1) | 1 |
| 0.001 B1 | 3 | 0 | 0 | 1 |

| % MIC of A alone | % MIC of B1 alone | MIC of each compound as a mixture | | FIC Index | |
|---|---|---|---|---|---|
|  |  | A % | B1% |  |  |
| 0.1 | 0.001 | 0.025 | 0.0005 | 0.75 | Ratio A/B1 = 50 |

The results obtained show synergistic inhibitory activity for the mixtures:
i) 0.025% of A and 0.0005% of B1, i.e. ratio A/B1=50
ii) 0.05% of A and 0.0005% of B1, i.e. ratio A/B1=100

*Aspergillus niger*

|  | concentrations tested (in weight %) | | | |
|---|---|---|---|---|
|  | 0 A | 0.0625 A | 0.125 A | 0.25 A |
| 0 B1 |  | 83 | 49 | 5 |
| 0.0025 B1 | 98 | 1 (FIC 0.5) | 1 (FIC 0.75) | 2 |
| 0.005 B1 | 98 | 1 (FIC 0.75) | 1 (FIC 1) | 1 |
| 0.01 B1 | 7 | 1 | 2 | 2 |

| % MIC of A alone | % MIC of B1 alone | MIC of each compound as a mixture | | FIC Index | |
|---|---|---|---|---|---|
|  |  | A % | B1% |  |  |
| 0.25 | 0.01 | 0.0625 | 0.0025 | 0.50 | Ratio A/B1 = 25 |

The results obtained show synergistic inhibitory activity for the mixtures:
i) 0.0625% of A and 0.005% of B1, i.e. ratio A/B1=12.5
ii) 0.125% of A and 0.005% of B1, i.e. ratio A/B1=25
iii) 0.0625% of A and 0.0025% of B1, i.e. ratio A/B1=25
iv) 0.125% of A and 0.0025% of B1, i.e. ratio A/B1=50

B) Mixtures with Compound B2: Chlorhexidine Hydrochloride

*Candida albicans*

|  | concentrations tested (in weight %) | | | | |
|---|---|---|---|---|---|
|  | 0 A | 0.025 A | 0.05 A | 0.1 A | 0.2 A |
| 0 B2 |  | 83 | 70 | 50 | 10 |
| 0.00025 B2 | 82 | 67 | 62 | 32 | 1 |
| 0.0005 B2 | 64 | 44 | 22 | 1 (FIC 0.75) | 0 (FIC 1) |
| 0.001 B2 | 14 | 0 | 0 | 0 | 0 |

| % MIC of A alone | % MIC of B2 alone | MIC of each compound as a mixture | | FIC Index | |
|---|---|---|---|---|---|
|  |  | A % | B2% |  |  |
| 0.2 | 0.001 | 0.05 | 0.0005 | 0.75 | Ratio A/B2 = 100 |

The results obtained show synergistic inhibitory activity for the mixtures:

i) 0.05% of A and 0.0005% of B2, i.e. ratio A/B2=100 ii) 0.1% of A and 0.0005% of B2, i.e. ratio A/B2=200

*Aspergillus niger*

| concentrations tested (in weight %) | 0 A | 0.025 A | 0.05 A | 0.1 A | 0.2 A | 0.4 A |
|---|---|---|---|---|---|---|
| 0 B2 |  | 228 | 109 | 73 | 72 | 6 |
| 0.025 B2 | 194 | 3 (FIC 0.19) | 3 (FIC 0.25) | 2 (FIC 0.37) | 2 (FIC 0.56) | 8 |
| 0.05 B2 | 121 | 3 (FIC 0.31) | 3 (FIC 0.37) | 3 (FIC 0.5) | 2 (0.75) | 1 |
| 0.1 B2 | 137 | 2 (FIC 0.56) | 3 (FIC 0.62) | 2 (FIC 0.75) | 2 (FIC 1) | 2 |
| 0.2 B2 | 2 | 2 | 2 | 4 | 4 | 8 |

| % MIC of A alone | % MIC of B2 alone | MIC of each compound as a mixture | | FIC Index | |
|---|---|---|---|---|---|
|  |  | A % | B2% |  |  |
| 0.4 | 0.02 | 0.025 | 0.0025 | 0.19 | Ratio A/B2 = 10 |

The results obtained show synergistic inhibitory activity for the mixtures:
i) 0.025% of A and 0.01% of B2, i.e. ratio A/B2=2.5
ii) 0.05% of A and 0.01% of B2, i.e. ratio A/B2=5
iii) 0.1% of A and 0.01% of B2, i.e. ratio A/B2=10
iv) 0.2% of A and 0.01% of B2, i.e. ratio A/B2=20 v) 0.025% of A and 0.05% of B2, i.e. ratio A/B2=5
vi) 0.05% of A and 0.05% of B2, i.e. ratio A/B2=10
vii) 0.1% of A and 0.05% of B2, i.e. ratio A/B2=20
viii) 0.2% of A and 0.05% of B2, i.e. ratio A/B2=40
ix) 0.025% of A and 0.0025% of B2, i.e. ratio A/B2=10
x) 0.05% of A and 0.0025% of B2, i.e. ratio A/B2=20
xi) 0.1% of A and 0.0025% of B2, i.e. ratio A/B2=40
xii) 0.2% of A and 0.0025% of B2, i.e. ratio A/B2=80

EXAMPLE 2: DETERMINATION OF THE SYNERGISTIC ANTIMICROBIAL ACTIVITY AS MIC

The demonstration of a synergistic antimicrobial activity effect with a mixture of 4-(3-ethoxy-4-hydroxyphenyl)butan-2-one (referred to as substance A) and of polyhexamethylene biguanide hydrochloride (referred to as substance B3) is performed according to the protocol described in Example 1, using the strain *Aspergillus niger*.

The following results were obtained:
*Aspergillus niger*

| | concentrations tested (in weight %) | | | |
|---|---|---|---|---|
| | 0 A | 0.0625 A | 0.125 A | 0.25 A |
| 0 B3 | | 85 | 48 | 7 |
| 0.0025 B3 | 91 | 7 (FIC 0.375) | 3 (FIC 0.625) | 2 |
| 0.005 B3 | 47 | 2 (FIC 0.5) | 2 (FIC 0.75) | 1 |
| 0.01 B3 | 24 | 2 (FIC 0.75) | 2 (FIC 1) | 2 |
| 0.02 B3 | 8 | 2 | −6 | 2 |

| % MIC of A alone | % MIC of B3 alone | MIC of each compound as a mixture | | FIC Index | |
|---|---|---|---|---|---|
| | | A % | B3% | | |
| 0.25 | 0.02 | 0.0625 | 0.0025 | 0.375 | Ratio A/B3 = 25 |

The results obtained show synergistic inhibitory activity for the mixtures:
i) 0.0625% of A and 0.0025% of B3, i.e. ratio A/B3=25
ii) 0.125% of A and 0.0025% of B3, i.e. ratio A/B3=50
iii) 0.0625% of A and 0.005% of B3, i.e. ratio A/B3=12.5
iv) 0.125% of A and 0.005% of B3, i.e. ratio A/B3=25
v) 0.0625% of A and 0.01% of B3, i.e. ratio A/B3=6.25
vi) 0.125% of A and 0.01% of B3, i.e. ratio A/B3=12.5

The invention claimed is:

1. An antimicrobial mixture comprising 4-(3-ethoxy-4-hydroxyphenyl)butan-2-one and an additional compound chosen from:
   i) a chlorhexidine compound chosen from chlorhexidine digluconate and chlorhexidine hydrochloride; and
   ii) a polyhexamethylene biguanide salt,
   wherein the combination of said 4-(3-ethoxy-4-hydroxyphenyl)butan-2-one and said additional compound exhibit synergistic antimicrobial activity.

2. The antimicrobial mixture according to claim 1, which comprises a poly-hexamethylene biguanide salt.

3. The antimicrobial mixture according to claim 2, which comprises 4-(3-ethoxy-4-hydroxyphenyl)butan-2-one and a polyhexamethylene biguanide salt in amounts such that the 4-(3-ethoxy-4-hydroxyphenyl)butan-2-one/polyhexamethylene biguanide salt weight ratio ranges from 5 to 75.

4. The antimicrobial mixture according to claim 3, wherein the polyhexamethylene biguanide salt is chosen from hydrochloride, borate, acetate, gluconate, sulfonate, tartrate and citrate.

5. The antimicrobial mixture according to claim 2, wherein the polyhexamethylene biguanide salt is chosen from hydrochloride, borate, acetate, gluconate, sulfonate, tartrate and citrate.

6. The antimicrobial mixture according to claim 2, wherein the polyhexamethylene biguanide salt is the hydrochloride salt.

7. The antimicrobial mixture according to claim 1, wherein the synergistic antimicrobial activity is against at least one of moulds and yeasts.

8. The antimicrobial mixture according to claim 1, wherein the synergistic antimicrobial activity is against at least one of *Aspergillus niger* and *Candida albicans*.

9. The antimicrobial mixture according to claim 1, which comprises a chlorhexidine compound chosen from chlorhexidine digluconate and chlorhexidine hydrochloride.

10. The antimicrobial mixture according to claim 9, which comprises 4-(3-ethoxy-4-hydroxyphenyl)butan-2-one and a chlorhexidine compound chosen from chlorhexidine digluconate and chlorhexidine hydrochloride in amounts such that the 4-(3-ethoxy-4-hydroxyphenyl)butan-2-one/chlorhexidine compound weight ratio ranges from 2 to 250.

11. The antimicrobial mixture according to claim 10, wherein the chlorhexidine compound is chlorhexidine digluconate.

12. The antimicrobial mixture according to claim 10, wherein the chlorhexidine compound is chlorhexidine hydrochloride.

13. The antimicrobial mixture according to claim 9, wherein the chlorhexidine compound is chlorhexidine digluconate.

14. The antimicrobial mixture according to claim 13, which has a 4-(3-ethoxy-4-hydroxyphenyl)butan-2-one/chlorhexidine digluconate weight ratio ranging from 25 to 150.

15. The antimicrobial mixture according to claim 13, which has a 4-(3-ethoxy-4-hydroxyphenyl)butan-2-one/chlorhexidine digluconate weight ratio ranging from 10 to 75.

16. The antimicrobial mixture according to claim 9, wherein the chlorhexidine compound is chlorhexidine hydrochloride.

17. The antimicrobial mixture according to claim 16, which has a 4-(3-ethoxy-4-hydroxyphenyl)butan-2-one/chlorhexidine hydrochloride weight ratio ranging from 60 to 250.

18. The antimicrobial mixture according to claim 16, which has a 4-(3-ethoxy-4-hydroxyphenyl)butan-2-one/chlorhexidine hydrochloride weight ratio ranging from 2 to 120.

19. A composition comprising, in a physiologically acceptable medium, an antimicrobial mixture according to claim 1.

20. The composition according to claim 19, which comprises at least one additional ingredient chosen from water, oils, polyols containing from 2 to 10 carbon atoms, gelling agents, surfactants, film-forming polymers, dyestuffs, fragrances, fillers, UV-screening agents, plant extracts, cosmetic and dermatological active agents, and salts.

21. The composition according to claim 19, wherein the 4-(3-ethoxy-4-hydroxyphenyl)butan-2-one is present in a content ranging from 0.01% to 5% by weight relative to the total weight of the composition.

22. A method for the conservation of a composition comprising a physiologically acceptable medium which comprises an antimicrobial mixture according to claim 1 in said composition.

* * * * *